United States Patent
Pedersen et al.

(10) Patent No.: US 8,934,932 B2
(45) Date of Patent: Jan. 13, 2015

(54) COMMUNICATION NETWORK AND METHOD

(75) Inventors: Klaus Ingemann Pedersen, Aalborg (DK); Luis Garcia, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 433 days.

(21) Appl. No.: 13/322,997

(22) PCT Filed: May 29, 2009

(86) PCT No.: PCT/EP2009/056669
§ 371 (c)(1),
(2), (4) Date: Dec. 28, 2011

(87) PCT Pub. No.: WO2010/136073
PCT Pub. Date: Dec. 2, 2010

(65) Prior Publication Data
US 2012/0108283 A1    May 3, 2012

(51) Int. Cl.
*H04W 16/10*    (2009.01)

(52) U.S. Cl.
CPC .................................. *H04W 16/10* (2013.01)
USPC ........... 455/509; 455/500; 455/501; 455/63.1

(58) Field of Classification Search
CPC ..... H04W 24/00; H04W 24/02; H04W 36/20; H04W 72/02; H04W 28/18; H04W 76/02; H04W 28/26; H04W 24/04; H04W 28/02; H04W 28/16; H04W 52/0216; H04L 47/125
USPC .................................................. 455/63.1, 509
See application file for complete search history.

(56) References Cited

U.S. PATENT DOCUMENTS

2009/0122773 A1*  5/2009  Gogic ........................... 370/338
2009/0213722 A1*  8/2009  Backes et al. .................. 370/201

OTHER PUBLICATIONS

R1-090235, 3GPP TSG RAN WG1 #55-bis Meeting, Ljubljana, Slovenia, Jan. 12-16, 2009, "Use of Background Interference Matrix for Autonomous Component Carrier Selection for LTE-Advanced", Nokia Siemens Networks, Nokia, 7 pgs.
R1-091779, 3GPP TSG RAN WG1 #57 Meeting, US, San Francisco, May 4-8, 2009, "Primary Component Carrier Selection, Monitoring, and Recovery", Nokia Siemens Networks, Nokia, 6 pgs.
3GPP TS 36.214 V9.2.0 (Jun. 2010), Technical Specification, $3^{rd}$ Generation Partnership Project; Technical Specification Group Radio Access Network Evolved Universal Terrestrial Radio Access (E-UTRA); Physical Layer; Measurements (Release 9), (14 pages).

* cited by examiner

*Primary Examiner* — Gennadiy Tsvey
(74) *Attorney, Agent, or Firm* — Harrington & Smith

(57) ABSTRACT

In a communication network including a plurality of base stations, a method including the steps of: sending a signal from said base station indicating that it will enter a period of inactivity, to at least one other base station; storing at that least one current parameter(s) relating to interference between base stations and/or updating said parameter(s) for forward use. The parameter(s) may relate to interference between first base station and at least one operationally neighboring base station and may be Background Interference Matrix (BIM) data.

25 Claims, 3 Drawing Sheets

COMMUNICATION NETWORK AND METHOD

BACKGROUND OF THE INVENTION

1) Field of the Invention

Embodiments of the invention relate to communications networks and systems, as well as a method therefor.

2) Description of the Related Art

A communication system can be seen as a facility that enables communication sessions between two or more entities. The communications may comprise, for example, communication of voice, electronic mail (email), text message, multimedia, other data and so on. A communication system can be provided for example by means of a communication network and one or more compatible communication devices. The communication network may be a local network.

A user can access a communication system by means of an appropriate communication device. A communication device of a user is often referred to as user equipment (UE). A communication device is provided with an appropriate signal receiving and transmitting apparatus for enabling communications, for example enabling fixed or wireless access to a communication network or communications directly with other users. Users may thus be offered and provided numerous services via their communication devices. Non-limiting examples of these services include two-way or multi-way calls, data communication or multimedia services or simply an access to a data communications network system, such as the Internet. A user who has accessed a system may also be provided broadcast or multicast content. Non-limiting examples of the content include downloads, television and radio programs, videos, advertisements, various alerts and other information.

Embodiments of the invention have particular but not exclusive application to local area (e.g. autonomous) cellular communications systems. In such systems, an arrangement of base stations in a communication system such as a cellular communication system, also referred alternatively as Node B's or evolved NodeBs (eNBs), operate generally without central control whereas conventional systems generally include a network controller for example. This enables cheap uncoordinated deployment of Node Bs in local area environments.

An autonomous component carrier selection scheme for LTE-A (Long Term Evolution Advanced) radio systems has been proposed which relies on each cell automatically selecting one of the component carriers as its primary carrier (also some-times called the base carrier). The primary/base carrier is assumed to be used for initial connection of User Equipment e.g. terminals in the cell. Depending on the offered traffic in a cell and the mutual interference coupling with the surrounding cells, transmission/reception on all component carriers may not always be the best solution. It has therefore been proposed that each cell dynamically selects additional component carriers for transmission/reception as well. The latter is referred to as selection of secondary component carriers (also some-times called extended carriers). All component carriers not selected for primary or secondary are completely muted (uplink/downlink) and not used by the cell.

The paper 3GPP TSG RAN WG1 No. 55-bis Meeting, Ljubljana, Slovenia, Jan. 12-16, 2009, entitled "Use of Background Interference Matrix for Autonomous Component Carrier Selection for LTE-Advanced" describes a system where eNBs in an autonomous network maintain information relating to interference coupling with surrounding cells by means of Background Interference Matrices (BIMs). A BIM is built up locally by each eNB based on measurements from the terminals (e.g. user equipment which) served by the eNB. Depending on the BIM and e.g. the offered traffic per cell, each eNB will autonomously select the component carriers it needs, while at the same time ensuring that it does not create excessive interference in the surrounding eNBs. Thus, the autonomous component carrier selection scheme essentially provides an automatic mechanism for dynamic frequency re-use on a component carrier resolution for LTE-Advanced based on BIM, and other information. The autonomous component carrier selection scheme has been mainly proposed for LTE-Advanced for optimizing the system performance in local area environments, where there is dense deployment of low power eNBs such as micro cells, Pico cells, Home eNBs, etc In communication systems such as for example autonomous (local area environments) systems which use with low power eNBs, such eNBs are typically not constantly on. Some low power eNBs are switched on and off depending on various needs; this is especially the case for Home eNBs owned by individual persons. Such Home eNBs are typically only switched on when the owner needs wireless access, whilst otherwise it is off, or in some kind of sleep/hibernation mode. Thus the number of active eNBs in a local environment becomes time-variant. In known systems, parameters are stored by eNBs relating to mutual interference coupling between eNBs, typically as Background Interference Matrix (BIM) data. As the dimensions of the BIM that each local eNB maintains depends on the number of neighbouring eNBs (that are on), the BIM information also needs updating when existing eNBs are switched off (or goes into sleep mode), or when other eNBs are switched on.

Secondly, as the local BIM information at each eNB is based on measurements from its associated terminals (including measurements to the new eNB); it takes time to build new BIM information whenever a new eNB is switched on.

It is an object of embodiments of the invention to provide an improved system which allows more efficient maintenance where eNBs are switched on and off over time.

SUMMARY OF THE INVENTION

In an embodiment of the invention is provided, in a communication network comprising a plurality of network elements, a method comprising the steps of: sending a signal from a network element to at least one other network element, indicating that it will enter a period of inactivity or it has entered a period of activity; and storing at that least one current parameter(s) relating to interference between network elements and/or updating said parameter(s) for forward use.

The network element may be a base station or evolved Node B.

The signal may be sent to and received by a neighbouring network element.

The parameter(s) preferably relate to interference between the first network element and at least one operationally neighbouring network element.

It may include the further step of forwarding said message or signalling to at least one further network element that the first network element is to enter a period of inactivity or is active again.

Preferably it includes subsequently reallocating carrier resources of one or more of network elements as a consequence.

In an embodiment it may be determined when said first network element is active. This may be provided by sending a message from said first network element to at least one network element indicating that it is switched on.

Previously stored parameters may used to updated current parameters by one or more network elements when said network element becomes active.

Carrier resources may be reallocated as a result.

The previously stored parameters may be stored by said first network element or forwarded to said first network element, and used to allocate/initialise carrier resources for said first network element when operable again.

The parameters may relate to mutual interference coupling between a pair of base stations (or eNode Bs) or cells associated with base stations, such as Background Interference Matrix (BIM) data.

The network may be autonomous communication network.

In an embodiment of the invention is also provided a computer program comprising program code means adapted to perform the steps of any of methods and computer readable medium comprising any such computer program.

In an embodiment of the invention is provided a network element, or a control apparatus therefor, comprising means to receive a signal from a second network element that the second network element enters a period of inactivity; including means to update and/or store at least one parameter(s) relating to interference between at least two network elements of a network and/or means to update said parameter(s) for forward use.

The parameter may relate to interference between said second network element and further network elements.

The base station may be an evolved node B, or control apparatus therefor.

The second/and or further network elements are base stations or evolved node Bs.

Preferably the network elements are operationally neighbouring network elements.

There may be means to forward said signal and/or said parameters to at least one further network element.

There are preferably means to reallocate carrier resources of base stations based on said parameters.

In an embodiment, there may be means to receive a message from said second network element that it is active and, as a consequence to reallocate and/or select carrier resources.

The network element, or control apparatus therefor, may be part of an autonomous communication system.

In an embodiment of the invention is also provided a network element or control processor therefor, comprising: means to send a signal to indicate to other network elements that the network element is to enter a period of inactivity or has become active; and means to receive and/or update at least one parameter relating to interference between the network element and at least one other network elements.

The other network element may be a neighbouring network element.

The parameter(s) may relate to interference between first base station and at least one operationally neighbouring base station, and/or may relate to Background Interference Matrix (BIM).

The network element may be a base station or evolved node B, or control processor therefor. Other network elements may also be base stations or evolved node Bs.

BRIEF DESCRIPTION OF THE DRAWINGS

For a better understanding of the present invention and how the same may be carried into effect, reference will now be made by way of example only, and to the accompanying drawings in which.

DETAILED DESCRIPTION OF THE INVENTION

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

Figure 1:
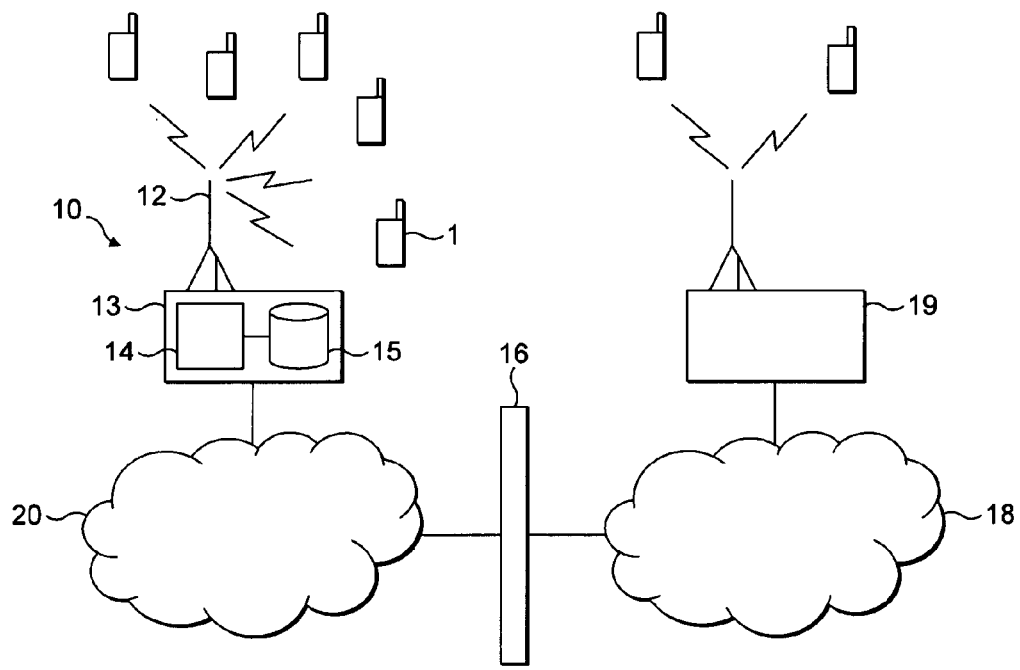
FIG. 1 shows an example of a communication system wherein below described examples of the invention may be implemented.

A communication device can be used for accessing various services and/or applications provided via a communication system. In wireless or mobile communication systems a wireless interface can be provided between mobile communication devices 1 and an appropriate access system 10. It is noted that although only one access system 10 is shown in FIG. 1, typically a number of access systems would be provided.

A communication device can be used for accessing various services and/or applications through the communication system. A mobile communication device 1 is typically provided wireless access via at least one base station 12 or similar wireless transmitter and/or receiver node of the access system. A base station site can provide one or more cells of the plurality of cells of a cellular communication system. A base station can be configured to provide a cell, but can also provide, for example, three sectors, each sector providing a cell. Each mobile communication device 1 and base station may have one or more radio channels open at the same time and may receive signals from more than one source.

A base station is typically controlled by at least one appropriate controller so as to enable operation thereof and management of mobile communication devices in communication with the base station. In certain communication systems such as autonomous systems, as will be explained in more detail later there may be no controller. The control apparatus can be interconnected with other control entities. In FIG. 1 the controller is shown to be provided by block 13. A control apparatus is typically provided with memory capacity 15 and at least one data processor 14. It shall be understood that the control apparatus and functions may be distributed between a plurality of controller units.

Non-limiting examples of appropriate access nodes are a base station of a cellular system, for example what is known as NodeB or enhanced NodeB (eNB) in the vocabulary of the 3GPP specifications. Other examples include base stations of systems that are based on technologies such as wireless local area network (WLAN) and/or WiMax (Worldwide Interoperability for Microwave Access).

The communication devices 1 can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. An example of the more recent developments in the standardization is the long-term evolution (LTE) of the Universal Mobile Telecommunications System (UMTS) radio-access technology that is being standardized by the 3$^{rd}$ Generation Partnership Project (3GPP). A further development of the LTE is referred to as LTE-Advanced. Other techniques may be used such as orthogonal frequency divisional multiple access (OFDMA) and SC-FDMA, e.g. for downlink and uplink operation respectively.

In FIG. 1 example the base station node 12 is connected to a wider communications network 20. A gateway function 16 may also be provided to connect to another network 18. This further network may also be connected to a further access system 19, which serves user devices. Any user device may serve as a start or end point. The other network may be any appropriate network, for example another communication network, a packet data network and so on. A communication system may thus be provided by one or more interconnect networks and the elements thereof, and one or more gateways may be provided for interconnecting various networks.

Figure 2:
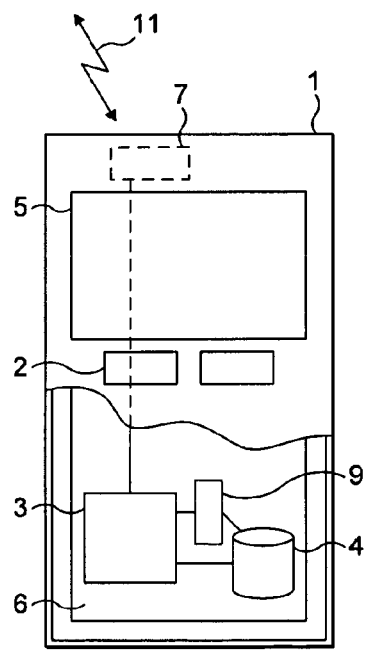
FIG. 2 shows an example of a communication device.

FIG. 2 shows a schematic, partially sectioned view of a communication device 1 that can be used for communication with a communication system. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device 1 may receive signals over an air interface 11 via appropriate apparatus for receiving and may transmit signals via appropriate apparatus for transmitting radio signals. In FIG. 2 a transceiver is designated schematically by block 7. The transceiver may be provided for example by means of a radio part and associated antenna arrangement. The antenna arrangement may be arranged internally or externally to the mobile device.

A mobile device is also typically provided with at least one data processing entity 3, at least one memory 4 and other possible components 9 for use in software aided execution of tasks it is designed to perform, including control of access to and communications with access systems. The data processing, storage and other relevant control apparatus can be provided on an appropriate circuit board and/or in chipsets. This feature is denoted by reference 6. The controller may include functionality to carry out any embodiments of the invention. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

Figure 3:
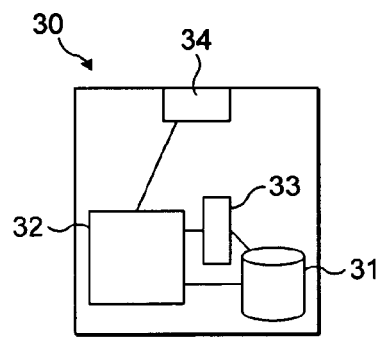
FIG. 3 shows an example of a controller for a base station.

FIG. 3 shows an example of a control apparatus 30 for a communication system, for example the access system of FIG. 1. The control apparatus 30 can be arranged to provide control on communications by roaming mobile communication devices that have entered the area of the system. The control apparatus 30 may be configured to implement any of the embodiments of the invention. The control apparatus may for example initiate messages and signals to inform other base stations that it is to be switched off. It may for example be adapted receive such information and store interference parameter and re-assign carrier resource information. The control apparatus 30 can be configured to execute an appropriate software code to provide the control functions as explained below in more detail.

For this purpose the control apparatus comprises at least one memory 31, at least one data processing unit 32, 33 and an input/output interface 34. Via the interface the control apparatus can be coupled to a receiver and a transmitter of the system, for example a base station antenna, so that it can receive/transmit a transmission from/to the communication device. Control on communications by the communication device can then be based on this determination.

Figure 4:
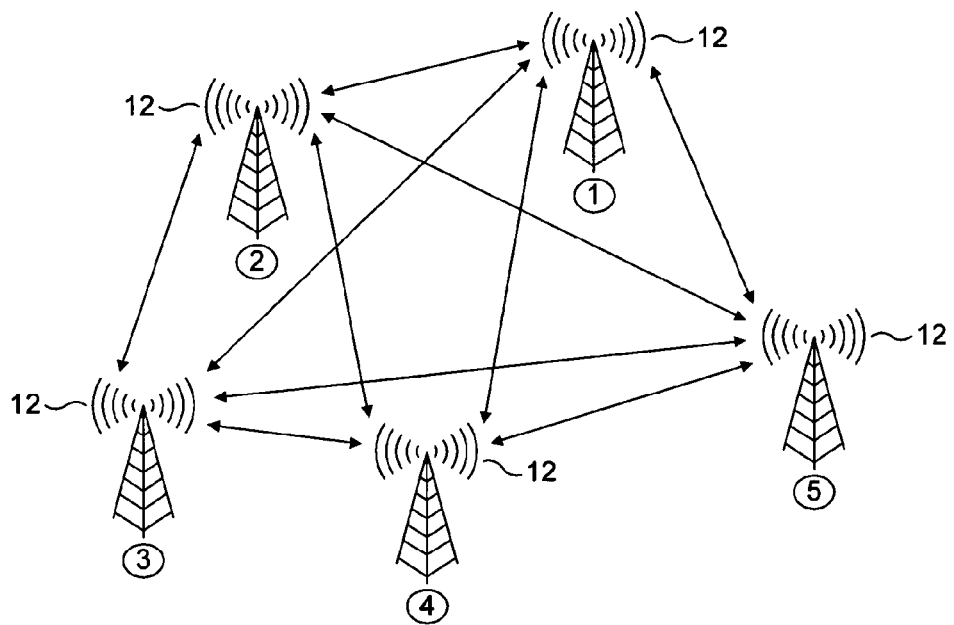
FIG. 4 shows a schematic representation of an autonomous communication network.

FIG. 4 shows a schematic example of a particular type of autonomous cellular communication system. The autonomous system or network includes a plurality of Node B's 12, whose main function is to communicate and serve User Equipment, such as mobile telephones (not shown) in their respective cells. The base stations may communicate with each other via e.g. Over The Air Communication (OTAC) or via a wired core network (e.g. X2 or S1 LTE interfaces). Such a system may embody embodiments of the invention. It may employ an autonomous component carrier selection scheme. Such a system is similar to that described above, except that there is no central co-ordinated control. Such as system may operate in both FDD and TDD mode, and is mainly estimated to provide performance benefits in local area environments such as indoor scenarios, and outdoor hotspot areas with dense deployment of Pico/micro cells. However the invention and embodiments are not limited to this. Such systems typical may employ autonomous eNode-B component carrier selection concept for LTE-Advanced. The basic idea is that each cell selects at least one active component carrier. Secondly, cells dynamically select additional component carriers, depending on the offered traffic conditions, radio conditions, etc. Component carriers not being selected by a cell may be muted, i.e. no transmission of any uplink/downlink channels and reference symbols is performed.

In a typical LTE-Advanced system, bandwidth is assumed to consist of a number of separate component carriers. In the example of FIG. 4 where there are 5 base stations, with 100 MHz system bandwidth, 5 component carriers of 20 MHz may generally be assumed. Assuming a bandwidth configuration with M=5 component carriers of e.g. 20 MHz bandwidth, each of the 5 Node Bs will have selected different component carriers for their primary. This means that if for instance a Node B is silent, then it is in principle able to receive parallel OTAC messages sent from all other Node Bs on different component carriers. However, assuming realistic filtering and transceiver implementation, a Node B cannot receive on one component carrier while at the same time transmitting on other component carriers. However, other configurations such as e.g. 4 component carriers of 10 MHz, or sets of component carriers with different bandwidth sizes could be configured as well according to embodiments of the invention. A Rel'8 terminal is a UE which is produced according to the 3GPP LTE Release 8 specifications. For LIE-A it is envisioned that backwards compatibility should be maintained, such that Rel'8 UEs should still be able to operate, even that the network is upgraded to higher releases terminal is assumed to be served by a single component carrier, while LTE-Advanced terminals can be served simultaneously on multiple component carriers.

In one configuration, each cell automatically may select one of the component carriers as its primary carrier (also some-times called the base carrier). The primary/base carrier is assumed to be used for initial connection of terminals in the cell. Depending on the offered traffic in cell and the mutual interference coupling with the surrounding cells, transmission/reception on all component carriers may not always be the best solution. It is therefore proposed that each cell dynamically selects additional component carriers for transmission/reception as well. The latter is referred to as selection of secondary component carriers (also some-times called extended carriers). All component carriers not selected for primary or secondary are completely muted (uplink/downlink) and not used by the cell.

For autonomous selection of primary and secondary component carriers, once a new LTE-Advanced (home) eNB is switched on, it shall start by selecting one of the component carriers as its primary. UEs cannot connect to the eNB before the primary carrier has been selected, and no signals are transmitted from it. The information available for selection of the primary component carrier is therefore mainly derived from local eNB measurements (e.g. uplink received interference on each component carrier) as well as including potential information from surrounding active eNB on which component carriers they have selected. Once the eNB has selected its primary component carrier, it can start to carry traffic. The quality of the primary component carrier is thereafter monitored by the eNB, and in case quality problems are detected, it may trigger a reselection, where another component carrier is selected as the primary. As the offered traffic increases for the cell, the eNB starts to allocate additional secondary component carriers, if this can be allowed without seriously degrading the performance of surrounding cells. Information available for secondary carrier selection (or release in case of lower offered traffic) could include both local eNB measurements, measurements from active terminals attached to the cell, as well as limited side-information from the surrounding eNBs. The latter may include information of which component carrier's different neighboring eNBs have selected for primary and secondary, as well as signaling to allow one eNB to indicate if it is experiencing severe quality problems on certain component carriers.

Uncoordinated deployment of eNBs in local area environments, e.g. autonomous cellular systems benefit from having support for dynamic frequency re-use mechanisms; known also as "autonomous component carrier selection" (alternatively referred to as "dynamic management of frequency band resources"). These refer to the same general type of scheme where each eNB dynamically selects to use only a subset of the available component carriers (i.e. using from one component carrier up to the maximum number of available component carriers).

As mentioned in the aforementioned paper a fully distributed scheme was proposed where component carriers are selected autonomously by each eNB depending on the offered traffic, interference coupling with neighbouring cells, etc. As the scheme is fully distributed, it does not involve additional processing load and uses background interference matrices (BIMs) for autonomous component carrier selection of secondary component carriers. This is a fairly simple and robust scheme, relying only on existing Rel'8 UE measurements (RSRP) as defined in 3GPP TS 36.214.

A Rel'8 terminal is assumed to be served by a single component carrier, while LTE-Advanced terminals can be served simultaneously on multiple component carriers. In the known system, each cell automatically selects one of the component carriers as its primary carrier (also sometimes called the base carrier) when the eNB is powered on. The primary carrier is used for initial connection of terminals in the cell. Depending on the offered traffic in cell and the mutual interference coupling with the surrounding cells, transmission and/or reception on all component carriers may not always be the best solution, especially for cell-edge users. It is therefore proposed that each cell dynamically selects additional component carriers for transmission/reception as well (i.e. second step after having selected the primary component carrier). The latter is referred to as selection of secondary component carriers (also sometimes called extended carriers). All component carriers not selected for primary or secondary are assumed to be completely muted (uplink/downlink) and not used by the cell. The selection of primary and secondary carriers is done locally by each cell and there is no need for centralized network control.

Constraints for selection of secondary component carriers may be standardised to avoid "greedy" eNBs, which blindly use all component carriers without taking the interference created towards other cells into account. One of these constraints is fulfilled before eNBs are allowed to allocate secondary component carriers. Once it is detected that the offered traffic for one eNB requires more bandwidth (i.e. more secondary component carriers), the following information sources may be used to determine if can be allowed to allocate more secondary component carriers: Radio Resource Allocation Table (RRAT) and Background Interference Matrix (BIM). The RRAT is a table expressing which component carriers are allocated by the surrounding eNBs. Hence, the RRAT is based on information from the surrounding eNBs. Additionally, it is known if a component carrier is allocated as a primary or a secondary component carrier. Each cell maintains information on all the potential interfering cells and a corresponding conditional C/I value. This is called the incoming BIM. The C/I value is a measure of mutual interference coupling between a pair of cells, in case the interfered cell and the interfering cell use the same component carrier simultaneously. For each active UE connected to the cell, RSRP measurements are reported. These measurements are conducted both towards the serving cell and the surrounding cells. The conditional C/I, expressed in decibel, describe the RSRP difference between the serving cell and the surrounding cells. Hence, based on the RSRP measurements reported from the different UEs, an empirical C/I distribution is built locally within each eNB. The C/I value stored in the BIM for each surrounding cell is the value corresponding to a certain outage of e.g. 90%. The values in the locally stored BIM can be updated either periodically or event based. As component carriers are likely to experience the same path loss conditions, the BIM is component carrier independent as it is only based on path-loss type of measurements (RSRP), i.e. it is sufficient for the UEs to only measure on a single component carrier per cell.

As mentioned when certain eNBs are switched off and switched back on again it takes time to build new BMI information again. In certain embodiments of the invention whenever an eNB is switched off or enters a periods of inactivity i.e. sleep mode, it sends a message to one or more neighbouring eNBs, so they can immediately remove that information for that particular eNBs in relation to the stored BIM. When the eNB is switched off, it immediately allows the other eNBs to use the radio resources previously being used by that particular eNB. The eNBs receiving information that an eNB is switched off, will store the current BIM information towards that eNB. This information is valuable, as it can then immediately be used the next time the eNB is switched on again. The latter helps improve the overall system performance and response time, as we can avoid waiting for new terminal measurements for (re-)building the BIM towards the eNB switched off. In order to make the above possible, new eNBs being switched on may inform the neighbouring eNBs that it is on again (the latter signalling have also been proposed on other inventions, so this is the novel part of the current invention).

Figure 5:
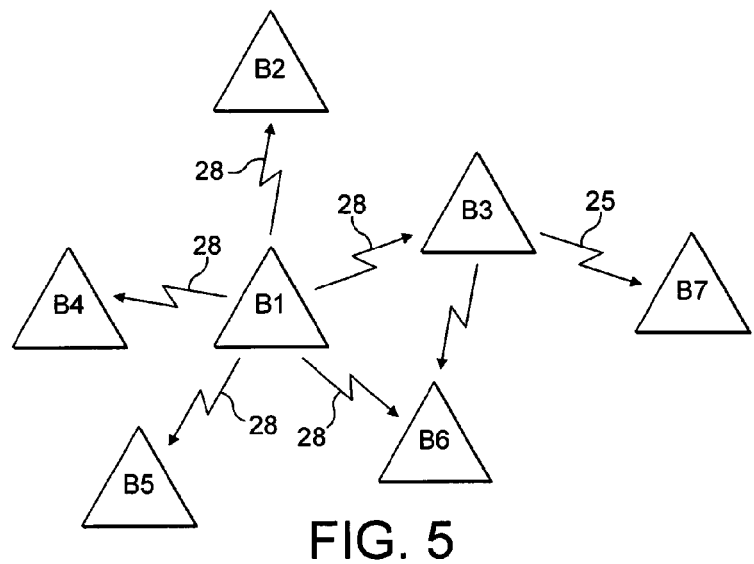
FIGS. 5 and 6 assist in the illustration of two simple embodiments of the invention.

FIG. 5 illustrates one simple embodiment of the invention. This schematic shows a portion of an autonomous network comprising a number of eNBs numbered B1 to B7, which may service user equipment (not shown). eNB B1 is about to be switched off. Before it does so, it may send a signal/message to one or more neighbouring eNBs (B2, B3, B4, B5, B6) marked by arrows 28, which is interpreted by the other eNBs that the eNB B1 is about to be switched off or enter a period of inactivity. At this stage any eNB which receives this signal, may store current BIM information, for use when the eNB is switched on again.

In one embodiment this BIM information may relate to interference between eNB B1 and the eNB which receives the message. In one embodiment this may be BIM information relating to that between the node that receive the message and further nodes; or any combination of the above.

This BIM information may already be stored by the eNB B2 in relation to eNB B1.

In certain embodiments, a message that eNB1 is to be switched off is forwarded to other eNBs, i.e. eNB B7, see arrow 25. Again eNB7 may then as a consequence store current BIM information, which may be utilised later as explained below.

In one embodiment BMI information may be sent by the eNB switching off, i.e. eNB1 to one or more neighbouring eNBs for storage and also may be forwarded to other eNBs.

As a consequence of receiving signals/message, either directly or indirectly that the eNB B1 is to be switched off, eNBs may also delete parameters relating to the eNB1 from the store which are used for current operation.

As a consequence, the eNBs which receive information via such a message (whether directly or indirectly) may reallocate their resources (e.g. reallocate) carriers appropriately.

The options of reallocating resources among the base stations would be varied and the various possibilities would be clear to the skilled person.

Figure 6:
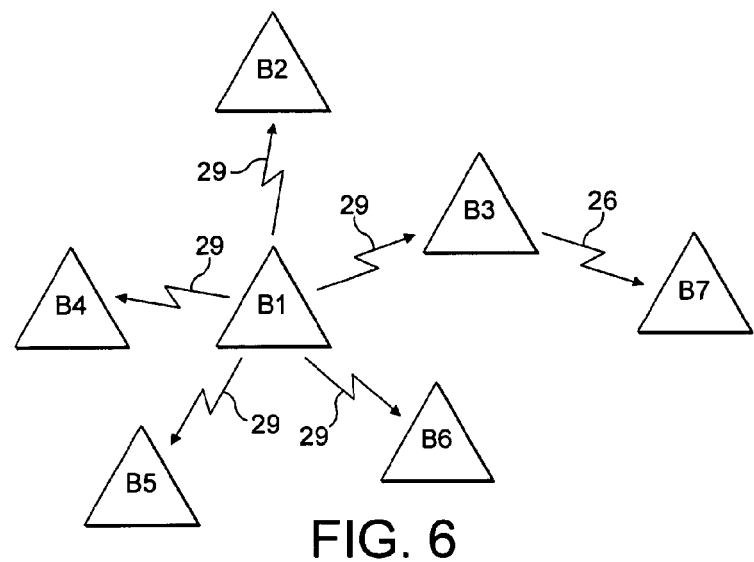

FIG. 6 shows one further embodiment where the eNB B1 is switched on again. The eNB B1 sends a message or signal to one or more neighbouring eNBs indicating that it has become active again, as shown by arrows 29. Again this signal may be forwarded by other eNBs such as eNB B7, see arrow 26.

As a consequence, the eNBs B2, B3, B4, B5, and B6 may again update their BIM information. In one embodiment those eNBs which receive the forwarded message (that the eNB B1 is switched on again) may also or in addition reallocate carrier resources. Carrier resources may be reallocated smartly by using the previously stored BIM information.

Following this the eNB (when switched on again) can receive the previously stored BIM information and utilise this when selecting carriers.

Embodiments of the invention allow the overall system performance to be improved e.g. in local area environments, where autonomous component carrier selection is used especially for highly dynamic scenarios, where low power eNBs are switched on and off during the day, i.e. time-variant number of active eNBs.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   receiving a signal from a network element in a communication network having a plurality of network elements, said signal indicating that said network element will enter a period of inactivity;
   storing, as a consequence of the signal, at least one current parameter relating to one of a plurality of carrier to interference ratios between said network element and at least one operational neighbouring network element for forward use; and
   updating the at least one current parameter using the stored at least one current parameter when said network element becomes active.

2. A method as claimed in claim 1 wherein said signal is sent to and received by a neighbouring network element.

3. A method as claimed in claim 1 including the further step of forwarding said signal or signalling to at least one further network element that the network element is to enter a period of inactivity or is active again.

4. A method as claimed in claim 1 including subsequently reallocating carrier resources of network elements.

5. A method as claimed in claim 1 including determining when said network element has become active.

6. A method as claimed in claim 5 comprising sending a signal from said network element to at least one other network element indicating that said network element is active.

7. A method as claimed in claim 1 wherein carrier resources of one or more network elements are reallocated as a result.

8. A method as claimed in claim 1 wherein said network elements are base stations or evolved node B's.

9. A method as claimed in claim 1 wherein said at least one current and at least one stored parameters relate to mutual interference coupling between a pair of base stations or evolved node Bs or cells associated with base stations or evolved node Bs.

10. A method as claimed in claim 1 wherein said at least one current and at least one stored parameters are Background Interference Matrix (BIM) data.

11. A method as claimed in claim 1 wherein said communication network is an autonomous communication network.

12. A computer program product comprising a non-transitory computer-readable storage medium bearing computer program code embodied therein for use with a computer, the computer program code comprising code for performing the method according to claim 1.

13. An apparatus comprising:
one or more processors; and
one or more memories including computer program code, the one or more memories and the computer program code being configured, with the one or more processors, to cause the apparatus to perform the following:
receive a signal from a network element that the network element will enter a period of inactivity;
store, as a consequence of the signal, at least one current parameter relating to one of a plurality of carrier to interference ratios between said network element and at least one operational neighbouring network element for forward use; and
update the at least one current parameter using the stored at least one current parameter when said network element becomes active.

14. The apparatus as claimed in claim 13 which is a base station or evolved node B and/or wherein said other network elements are base stations or evolved node Bs.

15. The apparatus as claimed in claim 13 wherein update the at least one current parameter includes using forwarded parameters.

16. The apparatus as claimed in claim 13, wherein the one or more memories and the computer program code are further configured, with the one or more processors, to cause the apparatus to forward said signal and/or said at least one current parameter to at least one further network element.

17. The apparatus as claimed in claim 13, wherein the one or more memories and the computer program code are further configured, with the one or more processors, to cause the apparatus to reallocate carrier resources of network elements based on said parameters.

18. The apparatus as claimed in claim 13, wherein the one or more memories and the computer program code are further configured, with the one or more processors, to cause the apparatus to receive a message from said network element that it is active and, as a consequence, to reallocate and/or select carrier resources.

19. The apparatus as claimed in claim 13, wherein said at least one current and at least one stored parameters are Background Interference Matrix (BIM) data.

20. The apparatus as claimed in claim 13, wherein said apparatus is part of an autonomous communication system.

21. An apparatus comprising:
one or more processors; and
one or more memories including computer program code, the one or more memories and the computer program code being configured, with the one or more processors, to cause the apparatus to perform the following:
send a signal to indicate to at least one network element that the apparatus is to enter a period of inactivity; and
send to said at least one network element at least one parameter relating to one of a plurality of carrier to interference ratios between the apparatus and at least one operational neighbouring network element.

22. The apparatus as claimed in claim 21 wherein said at least one parameter is Background Interference Matrix (BIM) data.

23. The apparatus as claimed in claim 21, wherein said apparatus is a base station or evolved node B.

24. The apparatus as claimed in claim 21 wherein said at least one network element is a base station or evolved node B.

25. The apparatus as claimed in claim 21, wherein said apparatus is part of an autonomous communication system.

* * * * *